United States Patent
Stümper

(10) Patent No.: US 9,429,439 B2
(45) Date of Patent: Aug. 30, 2016

(54) METHOD AND DEVICE FOR DETERMINING A VEHICLE POSITION IN A MAPPED ENVIRONMENT

(71) Applicant: AUDI AG, Ingolstadt (DE)

(72) Inventor: Stefan Stümper, Eichstätt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/422,997

(22) PCT Filed: Aug. 19, 2013

(86) PCT No.: PCT/EP2013/002494
§ 371 (c)(1),
(2) Date: Feb. 20, 2015

(87) PCT Pub. No.: WO2014/029490
PCT Pub. Date: Feb. 27, 2014

(65) Prior Publication Data
US 2015/0219462 A1  Aug. 6, 2015

(30) Foreign Application Priority Data
Aug. 23, 2012  (DE) .......................... 10 2012 016 800

(51) Int. Cl.
*G01C 21/34* (2006.01)
*G01C 21/00* (2006.01)
*G08G 1/14* (2006.01)

(52) U.S. Cl.
CPC ................ *G01C 21/34* (2013.01); *G01C 21/00* (2013.01); *G08G 1/145* (2013.01)

(58) Field of Classification Search
None
See application file for complete search history.

(56) References Cited

U.S. PATENT DOCUMENTS

| | | | |
|---|---|---|---|
| 2006/0186702 A1* | 8/2006 | Kisanuki | B60R 21/36 296/187.04 |
| 2007/0016372 A1 | 1/2007 | Browne | |
| 2007/0273557 A1 | 11/2007 | Baillot | |
| 2008/0101656 A1 | 5/2008 | Barnes | |
| 2008/0117023 A1 | 5/2008 | Wilcox | |
| 2010/0066587 A1* | 3/2010 | Yamauchi | G05D 1/0044 342/70 |
| 2012/0130595 A1* | 5/2012 | Hayakawa | B60W 30/12 701/42 |
| 2013/0154816 A1 | 6/2013 | Giesler | |

FOREIGN PATENT DOCUMENTS

| | | |
|---|---|---|
| DE | 32 48 544 | 7/1984 |
| DE | 40 26 649 | 2/1992 |
| DE | 201 17 574 | 3/2002 |

(Continued)

OTHER PUBLICATIONS

International Search Report issued by the European Patent Office in International Application PCT/EP2013/002494.

(Continued)

*Primary Examiner* — Adam Alharbi
(74) *Attorney, Agent, or Firm* — Henry M. Feiereisen LLC

(57) ABSTRACT

A method for determining a vehicle position of a vehicle to be located within a defined cruising range in a mapped environment is disclosed, wherein the vehicle position is determined by evaluating the position data of at least one predetermined component of the vehicle, and the position data are made available particularly by way of a plurality of position detecting sensors, which are fixedly arranged within the mapped environment.

9 Claims, 2 Drawing Sheets

(56) References Cited

FOREIGN PATENT DOCUMENTS

| DE | 11 2006 001 864 | 6/2008 |
| DE | 10 2008 006 356 | 7/2009 |
| DE | 10 2009 046 671 | 5/2011 |
| EP | 2 204 788 | 7/2010 |
| EP | 2 418 634 | 2/2012 |
| WO | WO 2008/112148 | 9/2008 |

OTHER PUBLICATIONS

Rainer Kümmerle et al.: Autonomous Driving in a Multi-level Parking Structure, in Proceedings of the 2009 IEEE, May 2009.

* cited by examiner

METHOD AND DEVICE FOR DETERMINING A VEHICLE POSITION IN A MAPPED ENVIRONMENT

CROSS-REFERENCES TO RELATED APPLICATIONS

This application is the U.S. National Stage of International Application No. PCT/EP20131002494, filed Aug. 19, 2013, which designated the United States and has been published as International Publication No. WO 2014/029490 and which claims the priority of German Patent Application, Serial No. 10 2012 016 800.4, filed Aug. 23, 2012, pursuant to 35 U.S.C. 119(a)-(d).

BACKGROUND OF THE INVENTION

The invention relates to a method and device for determining the position of a vehicle to be localized within a predetermined driving range in a mapped environment.

Motor vehicles have driver assist systems, which can actively intervene in driving situations. Such systems are for example lane warning systems which not only warn the driver when he drives over a white street marking but also perform a steering intervention to prevent a further driving over the marking. There are also driver assist systems, which additionally ensure the comfort of the driver, such as parking systems which are capable of parking the vehicle in a parking space without contribution of the driver. Such a parking system automatically parks a vehicle by way of steering intervention mostly together with automated speed control.

However, in order for a vehicle to take over driving from the driver completely, or in a manner adjusted to a particular situation, and to thus be able to act in a piloted manner, i.e., autonomously, the vehicle has to be able to very accurately analyze its own position within its (immediate or extended) environment and to perform a corresponding action planning.

Generally driver assist systems are known from the state-of-the-art in which distances between for example a vehicle and a beacon is determined so that a vehicle is for example capable to drive in a piloted manner in a parking garage, wherein the sensors are installed on the vehicle.

The German patent No DE 3248544 C2 discloses a system for transmission of items of information between positionally fixed beacons and a vehicle. The items of information are transmitted by means of infrared radiation by at least two transmitter receiver combinations arranged on the vehicle and oriented in different directions. The receivers arranged on the vehicle each have an interfering signal indicator, which blocks the receiver whose interfering signal is above a predetermined threshold. The at least two differently oriented transmitters/receivers allow an interference-free transmission also in the case of disadvantageous sun exposure, which may interfere with the reception of infrared signals.

From the German patent No DE 4026649 C1 a data transmission system with laser in the form of an infrared localization system is known. In this system a positionally fixed IR-beacon, which has a codification for identification, is recognized by a mobile transmitting/receiving unit which is arranged on the vehicle and emits a predetermined laser radiation, and the received (positional) data are then forwarded to an analysis device for analysis.

From the publication of the German patent application No DE 11 2006 001 864 T5 a system for observing the vehicle environment from a distant perspective is known in order to be able to observe a large area around the vehicle and in this way achieve improved collision warning, collision avoidance and collision reduction or an improved situational awareness of the driver. In this system at least one system consisting of a (video) camera system, a GPS system with map data base, a vehicle-vehicle communication system and a far/near range radar are provided, whereby positional data of objects in the vicinity of the vehicle and within the detection range are provided. The goal of the system is a two-dimensional or three-dimensional representation of the environment of the vehicle in which also obstacles are shown, wherein the driver can choose the angle of vision himself, for example from obliquely above or from obliquely behind the vehicle.

From the laid open patent document of the German Patent application No DE 10 2009 046 671 A1 a method for guiding a motor vehicle by means of a guiding device is known, wherein the environment of the vehicle is detected with an opto-electronic sensor fastened on the vehicle. This sensor scans the road and provides information regarding at least one limiting object, which is located in the road of the vehicle, wherein also a visual representation for the driver is possible via a display. The system also allows determining an optimal driving direction of the vehicle, which can be established through a steering intervention by the system.

From the publication of the international patent application No WO 2008/112148 A1 an AR (augmented reality) based system and method is known, in which an unmanned vehicle can be externally steered by a user, wherein the data required therefore (for example position or status of the vehicle etc.) are provided by a sensor which is fastened on the vehicle. These items of information are converted into a graphic and the graphic is then displayed for the user, wherein in addition a control of the vehicle is enabled via control elements displayed in the graphic.

A disadvantage of the systems described above is that the accuracy of the positional, determination of the vehicle is insufficient to provide an accurate reliable piloted control of the vehicle which is adjusted to the situational environment, i.e., an autonomous driving of the vehicle. This has an effect for example on a piloted parking or piloted navigating in narrow or hard to drive on environment.

SUMMARY OF THE INVENTION

An object of the invention is to provide a method which makes it possible to localize and also position a vehicle with high accuracy within a mapped or mappable environment in real time, so that the above mentioned disadvantages can be overcome, wherein at the same time a technical upgrading of the vehicle for example by additional sensors to be installed, is to be avoided.

This object is solved in one aspect by a method for determining a position of a vehicle within a predetermined driving area in a mapped environment, including identifying the vehicle in the mapped environment; obtaining positional data of at least one predetermined component of the vehicle with a sensor device fixedly arranged in the mapped environment; determining the position of the vehicle by analyzing the positional data; and navigating the vehicle through the mapped environment in a piloted manner, and in another aspect by a device for determining a position of a vehicle within a predetermined driving area of a mapped environment, including means for identifying the vehicle in the mapped environment; a sensor device fixedly arranged in the mapped environment and configured for providing positional data of at least one predetermined component of the vehicle; and an analysis device for determining the vehicle position from the positional data, wherein the vehicle is configured for being navigated through the mapped environment in a piloted manner. Advantageous embodiments are defined in the corresponding dependent claims.

In the method according to the invention for determining a position of a vehicle to be localized within a predetermined driving range in a mapped environment, the vehicle position is determined by an analysis of positional data of at least one predetermined component of the vehicle, wherein the positional data are provided by a sensor device fixedly arranged in the mapped environment.

The method according to the invention and the device according to the invention make it possible to solve the object of the present invention.

Advantageously in the method according to the invention the sensor device has multiple position detection devices and one of the multiple position detection devices is selected as master sensor which defines a global sensor coordinate system and the other ones of the multiple position detection devices describe their position in the defined sensor coordinate system. The advantage of a global coordinate system and the transfer of the date of the sensors into a global coordinate system is that thereby each object position is defined in this one coordinate system and thus a simpler, faster and more efficient analysis of the data can occur. As an alternative the sensor device can have a single sensor in particular a lidar sensor with angle detection.

Advantageously a tire of the vehicle is detected as the predetermined component. The advantage that at least one tire of a vehicle serves as the predetermined component, i.e., that the position determination occurs based on at least one tire of the vehicle is that the contours and materials of a tire are very accurately defined compared to the contours or materials of for example an outer mirror or a part of the vehicle body, which may reflect, be hard to measure due to additional design elements or the like. In addition the advantage of tires is that they are available at a defined distance from the ground for almost every vehicle independent of their size or the size or type of the vehicle.

Advantageously in the method according to the invention the positional data of four tires of the vehicle to be localized are detected. The advantage of the measurement of the position of all tires of a vehicle, particularly a passenger car, is that this significantly improves the position determination within the mapped environment.

Advantageously the positional data of each of the at least one predetermined component are monitored over time and plausibilized so that the position of each predetermined component is determined and then the position of the vehicle relative to the sensor coordinate system is determined by fusing the positional data of each of the at least one predetermined component. The plausibility testing and fusion of the measured positional data of each of the sensors significantly improve the position determination as a result of the greater amount of available data.

Advantageously the positional data are analyzed in real time in the method according to the invention. The advantage of the analysis in real time is that a reaction for example in response to an obstacle occurs immediately, i.e., within a few milliseconds and thereby the risk of an undesired collision with the obstacle is significantly reduced.

Advantageously in the method according to the invention each of the multiple position detection sensors has an opening angle of 180° and a range of up to 30 m. The advantage of this dimensioning of the sensors is that the great opening angle and the high range enable covering a large area to be monitored and thus overall fewer sensors have to be used than in a smaller opening angle and short range.

Advantageously in the method according to the invention each of the multiple position detection sensors is a lidar sensor. The advantage of lidar sensors is, in particular in protected environments, that the used laser measuring method enables a highly accurate distance measurement which makes these sensors ideal for a highly accurate position detection of a vehicle.

In a further embodiment of the invention a device is provided for determining a position of a vehicle to be localized within a predetermined driving region in a mapped environment with a sensor device fixedly arranged within the mapped environment, which is configured for providing positional data of at least one predetermined component of the vehicle, and with an analysis device for determining the vehicle position from the positional data. This device makes it possible to use the method according to the invention.

BRIEF DESCRIPTION OF THE DRAWING

In the following the invention is described in more detail with reference to the drawings, wherein.

DETAILED DESCRIPTION OF PREFERRED EMBODIMENTS

Figure 1:
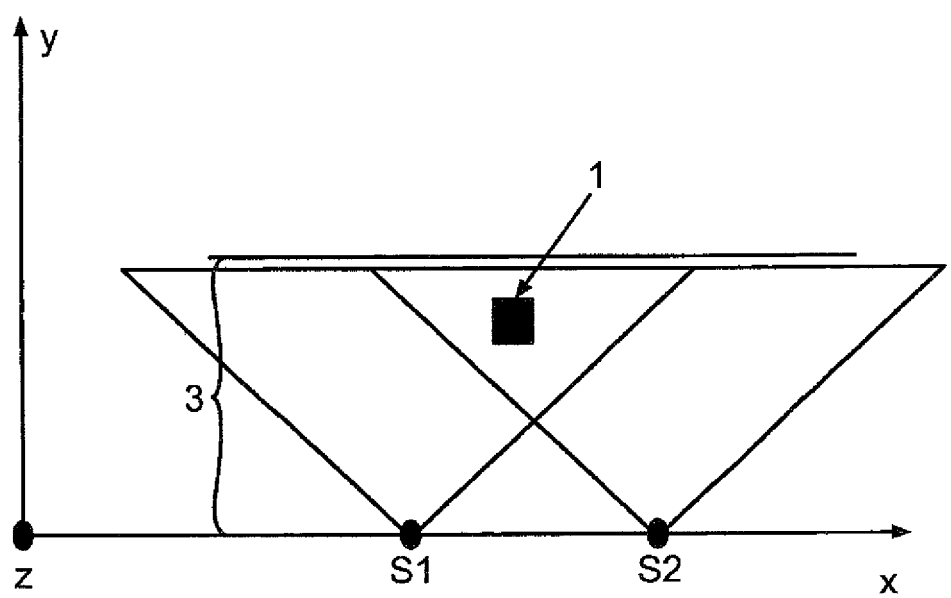
FIG. 1 shows a top view onto the sensors for illustrating the calibrating of a pair of position detection sensors.

In the following the method is illustrated by way of the example of multiple position detection sensors arranged in a parking garage. The position detection sensors enable a highly accurate localization of a vehicle and with this a piloted, i.e., automated parking of a vehicle. This requires that the position of the vehicle can be detected with high accuracy.

A first precondition for performing the method is that the parking garage, used as an example here, is either already mapped, i.e., for example a CAD architects plan is available, or that the parking garage is measured with very high accuracy, i.e., a mapped environment is established from a mappable environment. This parking garage further has to be equipped with position detection sensors fixedly arranged therein. For this multiple position detection sensors are placed in the parking garage so that the visible range, i.e., the range each individual of the multiple sensors can cover or monitor, of at least two of the sensors overlaps in a predetermined range, which is schematically shown as top view in FIG. 1. The position detection sensors S1 and S2 are arranged in the parking garage so as to cover the entire driving area 3 of the parking garage without gaps. It should be noted that the method can be preformed in any mapped or mappable environment in which position detection sensors can be arranged according to the invention.

In order to be able to detect the position of an object in the parking garage with high accuracy and with this enable a piloted driving, the positional data of the vehicle have to be detected so that these data can be processed in as close to real time as possible. For this it is practical to span a global coordinate system over all sensors so that the positional data of each individual sensor is described in this one coordinate system. This facilitates the calculation of the overall position of the object in the parking garage.

For generating the global coordinate system the position detection sensors have to be calibrated after being arranged in the parking garage. For this a sensor coordinate system is generated for each of the position detection sensors, in which the positional data of an object measured by each of the position detection sensors, for example a tire of a vehicle, are described. Thereafter the data described in the coordinate systems of the individual position detection sensors have to be transferred into a coordinate system that is easier to interpret or easier to analyze, and which clearly indicates the position of the vehicle based on all measuring data of the position detection sensors arranged in the parking garage, i.e., the positional data of the individual sensors are transferred into a global sensor coordinate system.

For this a central control device such as a conventional PC, is provided in the processing center of the parking garage, from which also the barriers etc. are controlled which is provided with the measuring data of each of the sensors and which transfers the data into a global sensor coordinate system by means of an appropriate algorithm. On this control device the measuring data generated by the position detection sensors for a vehicle driving in the parking garage can be analyzed by means of the appropriate intelligent algorithm and then instructions outputted to the vehicle for example for the piloted parking or driving through the parking garage. The control device thus not only serves as receiving unit for the measured positional data, but also as analysis device to analyze the positional data and thereby determine the vehicle position and also guide the vehicle.

As shown in FIG. 1 for the purpose of calibration of the position detection sensors a respective object 1 is brought in the overlapping visual range of two adjacent sensors S1 and S2 of the multiple position detection sensors S1 to Sn, i.e., the sensors S1 to Sn are grouped pairwise. Each of the two pairwise grouped sensors S1 and S2 recognizes the object 1 and assigns the object corresponding coordinates x1, y1, z1; x2; y2, z2 in its coordinate system. This method is performed for all sensors S1 to Sn arranged in the parking garage; the sensors are thus grouped pairwise, recognize an object and assign the object coordinates in their respective coordinate system. Then, the coordinates assigned to the object 1 by each pair of the sensors are compared and described in a coordinate system predetermined by one of the position detection sensors as the global coordinate system. This means that as a result of the respective comparisons the object 1 is described in an own global coordinate system. Hereby the coordinate system of the first used sensor S1, the so called master, serves as reference system for this single global coordinate system, i.e., as the global coordinate system. All other sensors S2 to Sn span their coordinate system in this coordinate system so that the position of the object 1 is precisely projected in this new global coordinate system and thus a virtual sensor is created.

Also multiple objects can be used for the calibration so that plausibilized date are obtained (not shown in FIG. 1).

After the calibration is completed the method according to the invention for determining a vehicle position can be applied. A re-calibration or new calibration only has to be conducted when the position or number of the sensors S1 to Sn changes, i.e., when a new global coordinate system has to be spanned.

A further prerequisite for performing the method according to the invention is that the vehicle to be localized identifies itself at the parking garage. This occurs by communication devices, which are already standardly integrated in the vehicle or external communication devices by which the vehicle can be identified. For example the vehicle can identify itself at the parking garage by means of mobile communication such as WLAN or a navigation system by transmitting vehicle specific data to the parking garage. It is also possible that the vehicle is navigated by a navigation system to a parking garage equipped with position detection sensors S1 to Sn and identifies itself to the parking garage via this navigation system. For the identification, data which are specific for the vehicle are transmitted to the parking garage, more specifically to the control device in the parking garage, which for example contain the tire distance specific for this vehicle and/or the tire number. In any case, the vehicle or the vehicle type can be identified via the transmitted data. In addition to the mentioned possibilities any type of identification of the vehicle is conceivable.

When the vehicle, for example a passenger car which has identified itself beforehand to the parking garage, drives into or through the parking garage, the type of the vehicle is already known as a result of this identification. The sensors S1 to Sn are thus prepared to recognize a component 2 of the vehicle such as one or more tires situated at a distance to each other, and to detect the positional data x1, y1, z1 to xn, yn, zn thereof. When driving through the parking garage a compilation of measuring points is thus created for at least one component 2 of the vehicle by the position detection sensors S1 to Sn arranged in the parking garage. These data are monitored over time by means of the intelligent algorithm running on the control device, plausibilized and fused. This means that the positional data of each of the at least one predetermined component 2 of the vehicle, i.e., of a tire, are monitored over time and are plausibilized so that the position of each of the at least one predetermined component 2 is determined and then by fusing the positional data of each of the at least one predetermined component 2 the position of the vehicle relative to the sensor coordinate system is determined. Fusing means hereby that items of information of multiple sensors are combined supported by a processor in order to thereby obtain a better result, in that for example new items of information are deduced by a combination of different sensors, or an improvement of the sensor information by utilizing multiple similar sensors is achieved. The results of the position detection sensors are thus intelligently combined by means of an algorithm and thereby a gap-free and highly accurate state estimation achieved. As a result a definite and highly accurate statement regarding the position and orientation of the observed component 2 of the vehicle, i.e., for example the tire relative to the global coordinate system is achieved.

This method may not only be performed for example for one tire of the vehicle but also for all four tires for example of a passenger car. The four position and orientation hypotheses that result thereby for each tire again result when fused, monitored over time and plausibilized in a highly accurate overall hypothesis regarding the position of the vehicle relative to the global coordinate system.

Because the position of the global sensor coordinate system relative to the mapped environment, i.e., the parking garage, is known, the absolute position of the vehicle inside the parking garage can be determined with very high accuracy regardless of whether the positional data of only one tire are analyzed or that of all tires of the vehicle. The analysis occurs by way of the intelligent algorithm.

By fusing the sensor data by way of the intelligent algorithm it is possible to conduct the analysis in real time, i.e., without delay due to calculations. Thus a steering of a vehicle in the parking garage or in any other mapped environment, for example for the purpose of parking or navigating, can be realized in real time.

Figure 2:
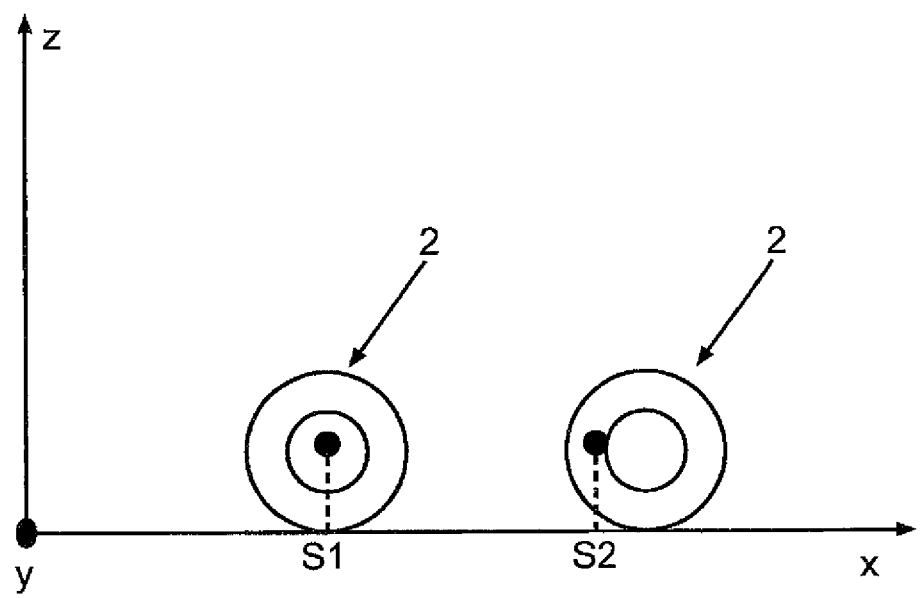
FIG. 2 shows a schematized view which shows the arrangement of the position detection sensors arranged at the height of the tires of a vehicle driving in a parking garage according to an exemplary embodiment of the invention.

In a preferred embodiment the position determining sensors S1 to Sn are arranged in the parking garage at the height of the tires 2 of a vehicle as shown in FIG. 2. Even though the size of tires 2 for vehicles differs, it is unproblematic for a person with skill in the art to place the sensors at an appropriate height inside the parking garage so as to detect all conceivable tire types of vehicles of any type. Also when the sensors S1 to Sn are for example used in a tunnel, the height at which the sensors S1 to Sn are arranged is not a challenge for the skilled artisan.

Preferably lidar sensors (light detection and ranging) sensors are used as position detection sensors S1 to Sn. The lidar measuring method is a method closely related to the radar measuring method, for optical distance and speed measurement, wherein instead of radio waves laser beams are used. The advantage of using lidar sensors is that they are very cost effective and on the other hand enable a highly accurate distance measurement to the object in protected environments such as a parking garage or a tunnel by measuring the distance by means of laser pulses and detecting the light reflected back from an object.

The position detection sensors S1 to Sn which are fixedly arranged in the exemplary parking garage, are not only preferably arranged at the height of the tires 2 of a vehicle by also have an opening angle, of preferably 180. Preferably the sensors have a range of up to 30 meters. Preferably the sensors have an opening angle of 180° and a range of up to 30 meters. Thus the entire monitored driving area 3 inside the parking garage can be covered without gaps with a manageable number of sensors S1 to Sn.

Even though vehicles with four tires driving in a parking garage were used as an example to describe the method according to the invention, the method is not limited to this situation. Rather, the method can be used in any other mapped or mappable environment such as a tunnel so long as the sensors can be arranged therein so that the method can be performed according to the invention. Also the vehicle does not necessarily have to have four tires, a motorcycle or a vehicle with three tires etc. can also be detected with high accuracy by the method according to the invention.

The method according to the invention allows determining the position of a vehicle inside a mapped or mappable environment in real time with high accuracy by the algorithm so that it is also possible to navigate a vehicle through the mapped environment or to for example park the vehicle in a piloted manner.

The invention claimed is:

1. A method for determining a position of a vehicle within a predetermined driving area in a mapped environment, comprising:
   identifying the vehicle to the mapped environment;
   obtaining positional data of at least one predetermined component of the vehicle with a sensor device fixedly arranged in the mapped environment;
   determining the position of the vehicle by analyzing the positional data; and
   navigating the vehicle through the mapped environment in a piloted manner.

2. The method of claim 1, wherein the sensor device comprises a plurality of position detection sensors, wherein the method further comprises selecting one of the plurality of position detection sensors as a master sensor, which defines a global sensor coordinate system, and wherein the remaining ones of the plural position detection sensors describe their positional data in the global sensor coordinate system.

3. The method of claim 1, wherein the predetermined component is a tire of the vehicle.

4. The method of claim 3, wherein the positional data comprise positional data of four tires of the vehicle.

5. The method of claim 2, further comprising monitoring and plausibilizing the positional data of each of the at least one predetermined component over time, thereby determining a position of each of the at least one predetermined component, and determining the position of the vehicle relative to the sensor coordinate system by fusing the positional data of each of the at least one predetermined component.

6. The method of claim 5, wherein the positional data are analyzed in real time.

7. The method of claim 2, wherein each of the plurality of position detection sensors has an opening angle of 180° and a range of up to 30 m.

8. The method of claim 2, wherein each of the plurality of position detection sensors is a lidar sensor.

9. A device for determining a position of a vehicle within a predetermined driving area of a mapped environment, comprising:
   means for identifying the vehicle to the mapped environment;
   a sensor device fixedly arranged in the mapped environment and configured for providing positional data of at least one predetermined component of the vehicle; and
   an analysis device for determining the vehicle position from the positional data,
   wherein the vehicle is configured for being navigated through the mapped environment in a piloted manner.

* * * * *